US009846999B1

(12) United States Patent
Pickover et al.

(10) Patent No.: US 9,846,999 B1
(45) Date of Patent: Dec. 19, 2017

(54) SMARTPHONE SAFETY SYSTEM FOR PEDESTRIANS

(71) Applicant: INTERNATIONAL BUSINESS MACHINES CORPORATION, Armonk, NY (US)

(72) Inventors: Clifford A. Pickover, Yorktown Heights, NY (US); Maja Vukovic, New York, NY (US); Komminist Weldemariam, Nairobi (KE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/245,548

(22) Filed: Aug. 24, 2016

(51) Int. Cl.
G08B 23/00 (2006.01)
G08B 5/22 (2006.01)
G08B 6/00 (2006.01)
H04W 4/02 (2009.01)
G06K 9/00 (2006.01)
G06K 9/62 (2006.01)
G06T 7/00 (2017.01)
H04M 1/725 (2006.01)

(52) U.S. Cl.
CPC ......... *G08B 5/222* (2013.01); *G06K 9/00248* (2013.01); *G06K 9/6289* (2013.01); *G06T 7/004* (2013.01); *G08B 6/00* (2013.01); *H04M 1/72519* (2013.01); *H04W 4/02* (2013.01); *H04W 4/021* (2013.01); *G06T 2207/30196* (2013.01); *H04M 2250/12* (2013.01); *H04M 2250/52* (2013.01)

(58) Field of Classification Search
CPC .. G08B 5/222; G06K 9/00248; G06K 9/6289; G01S 15/93

USPC ...................................................... 340/573.1
See application file for complete search history.

(56) References Cited

U.S. PATENT DOCUMENTS 9,049,583 B2 * 6/2015 Kolodziej ............. H04W 4/023
9,286,794 B2 * 3/2016 Duncan ................. G08G 1/005
9,301,082 B2 3/2016 Meyers et al.
(Continued)

FOREIGN PATENT DOCUMENTS

CN 104427055 3/2015
EP 2335438 6/2011
WO 2010042545 4/2010

OTHER PUBLICATIONS

Schmidt, "Always practise safe text: the German traffic light for smartphone zombies", http://www.theguardian.com/cities/2016/apr/29/always-practise-safe-text-the-german-traffic-light-for-smartphone-zombies?CMP=oth_b-aplnews_d-1, Apr. 29, 2016, 2 pages.

(Continued)

*Primary Examiner* — Eric M Blount
(74) *Attorney, Agent, or Firm* — Louis J. Percello; Andrew D. Wright; Roberts Mlotkowski Safran Cole & Calderon, P.C.

(57) ABSTRACT

Systems and methods for providing real-time alerts to a user of a device in or near a potentially dangerous situation are disclosed. A computer-implemented method includes determining, by the mobile device, that a user is looking at the mobile device based on sensor data, determining, by the mobile device, an area of a likely accident event, and generating, by the mobile device, an alert based on the determining that the user is looking at the device and the determining the area of the likely accident event.

17 Claims, 6 Drawing Sheets

(56) References Cited

U.S. PATENT DOCUMENTS

| | | | | |
|---|---|---|---|---|
| 9,363,361 | B2* | 6/2016 | Kimchi | H04M 1/72569 |
| 9,420,559 | B2* | 8/2016 | Bai | H04W 64/00 |
| 2008/0129541 | A1 | 6/2008 | Lu et al. | |
| 2012/0032806 | A1* | 2/2012 | Lee | G08B 23/00 |
| | | | | 340/573.1 |
| 2012/0262582 | A1* | 10/2012 | Kimchi | H04M 1/72569 |
| | | | | 348/159 |
| 2014/0111646 | A1 | 4/2014 | Hamilton | |
| 2015/0154868 | A1* | 6/2015 | Neuner | G01C 21/3685 |
| | | | | 340/932.2 |
| 2016/0091606 | A1 | 3/2016 | Shin et al. | |
| 2016/0295006 | A1* | 10/2016 | Hannon | H04M 1/72552 |
| 2016/0343256 | A1* | 11/2016 | Song | G08G 1/005 |
| 2016/0351049 | A1* | 12/2016 | Hamada | G08G 1/0967 |

OTHER PUBLICATIONS

Fowler, "Texting While Walking Isn't Funny Anymore", http://www.wsj.com/articles/texting-while-walking-isnt-funny-anymore-1455734501, Feb. 17, 2016, 9 pages.

Adewunmi, "Texting While Walking Can Be More Dangerous Than Distracted Driving", http://blog.suny.edu/2014/03/texting-while-walking-can-be-more-dangerous-than-distracted-driving/, Mar. 31, 2014, 3 pages.

Office of Compliance, "The Hazards of Using Mobile Devices While Walking", http://www.compliance.gov/sites/default/files/wp-content/uploads/2010/06/Walking-Hazards-April-2010-Fast-Fact.pdf, Apr. 2010, 3 pages.

Lynch, "Apple's Transparent Texting Patent Would Help You Walk and Text", http://www.gizmodo.co.uk/2014/03/apples-transparent-texting-patent-would-help-you-walk-and-text/, Mar. 27, 2014, 5 pages.

* cited by examiner

SMARTPHONE SAFETY SYSTEM FOR PEDESTRIANS

BACKGROUND

The present invention generally relates to an accident avoidance device, system, and method and, more particularly, to a device, system, and method for providing real-time alerts to a user of a device in or near a potentially dangerous situation.

Distracted smartphone users are a danger to themselves and others. Smartphone users stagger about cities like zombies, oblivious to the risk of not paying attention to surroundings. Smartphone use while walking has been shown to both decrease walking speed and stride length, putting the user off balance and less likely to walk in a straight line. As smartphone use has increased, pedestrian injuries have also increased—the number of emergency room visits in the Unites States involving distracted pedestrians using mobile phones was up 124% from 2010 to 2014.

SUMMARY

In an aspect of the invention, a computer-implemented method includes: determining, by a mobile device, that a user is looking at the mobile device based on sensor data, determining, by the mobile device, an area of a likely accident event, and generating, by the mobile device, an alert based on the determining that the user is looking at the device and the determining the area of the likely accident event.

In an aspect of the invention, there is a computer program product for a safety system for users, the computer program product comprising a computer readable storage medium having program instructions embodied therewith, the program instructions executable by a mobile device to cause the mobile device to, receive data from at least one sensor of the mobile device, determine that a user is looking at the mobile device based on the received data, determine a cohort of the user, the cohort being a group having characteristics similar the user, and execute on the mobile device an alert based on the user being determined to be looking at the mobile device and data of the cohort.

In an aspect of the invention, there is a system for provide for pedestrian safety. The system includes a CPU, a computer readable memory and a computer readable storage medium associated with a mobile device, program instructions to receive data from at least one sensor of the mobile device, program instructions to determine that a user is looking at the mobile device based on the received data, program instructions to determine a user affective state of the user, and program instructions to execute an alert based on the determining the user is looking at the device and the user affective state of the user, wherein the program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
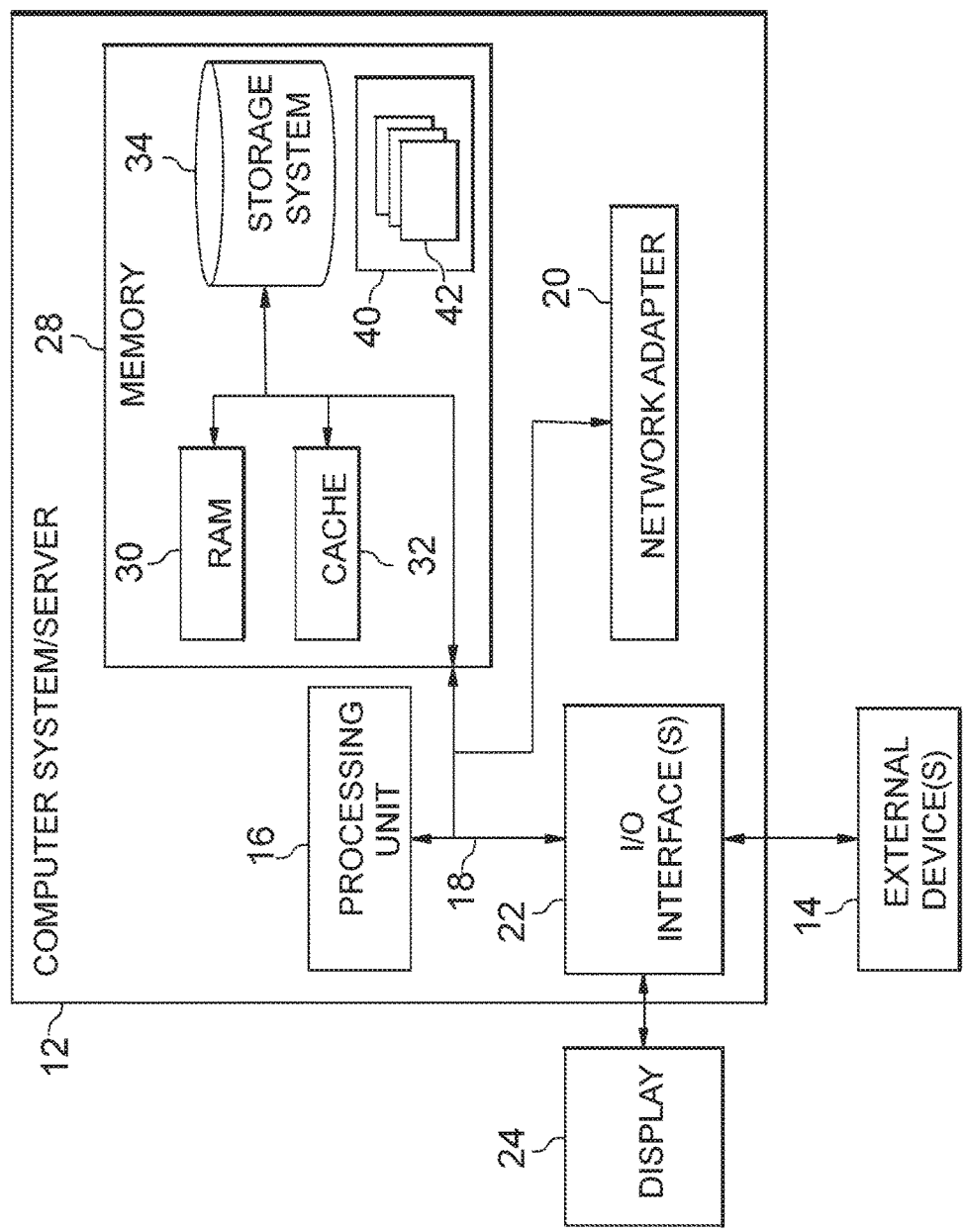
FIG. 1 depicts a cloud computing node according to an embodiment of the present invention.

The present invention relates generally to an accident avoidance device, system, and method and, more particularly, to a device, system, and method for providing real-time alerts to a user of a mobile device in or near a potentially dangerous situation. Implementations of the present invention can be used to help a user avoid an accident while the user is locomoting and looking at and/or interacting with a mobile device by providing real-time alerts based on analysis of data detected by one or more mobile devices, e.g., a cohort.

A cohort may be a group of similarly situated users from which data is gathered and analyzed, and, in embodiments, alerts are provided to one or more users of the cohort based on the analysis of data from the cohort. As a result, the alert is generated and/or determined based on data from the determined cohort, and presented on one or more mobile devices in an intelligent manner.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
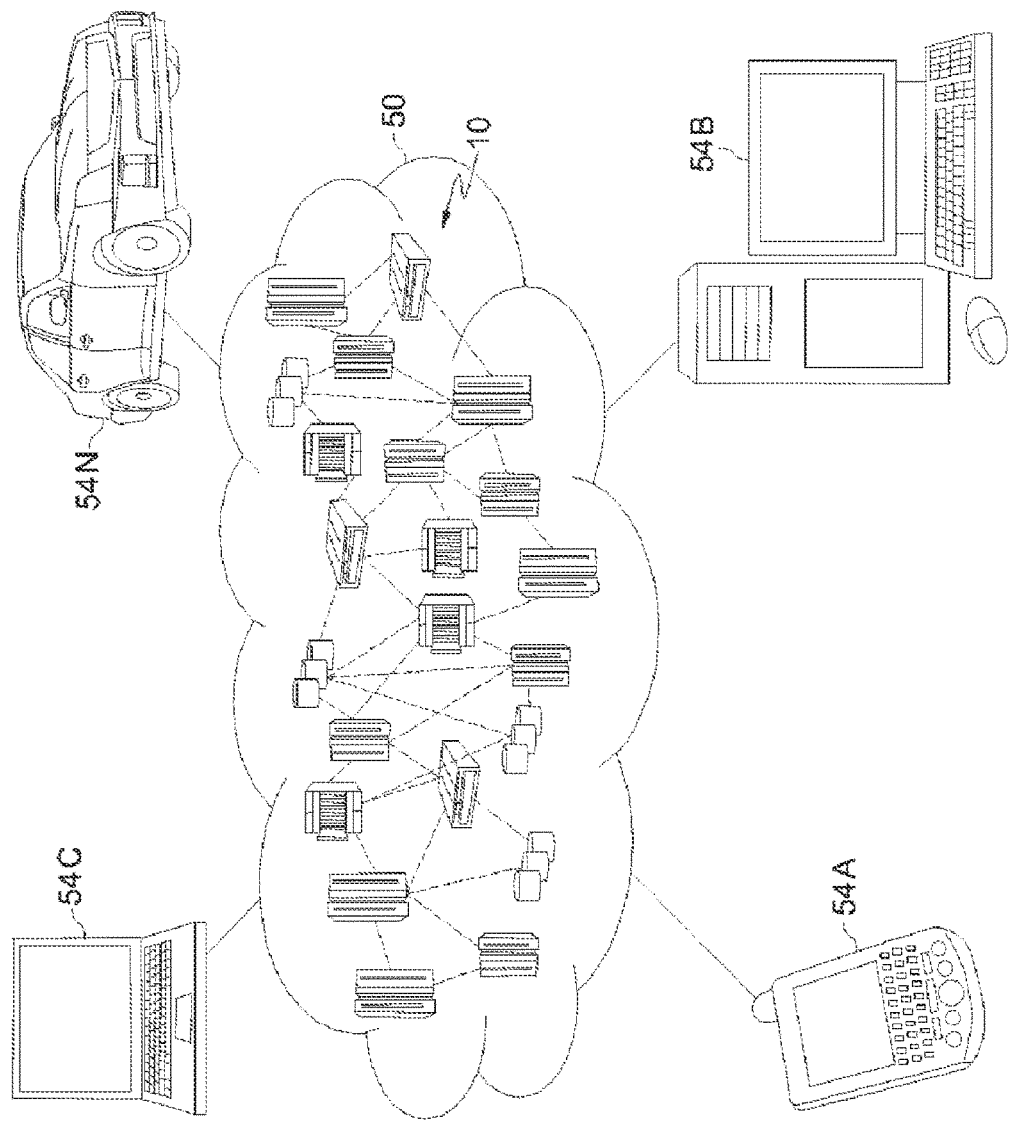
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
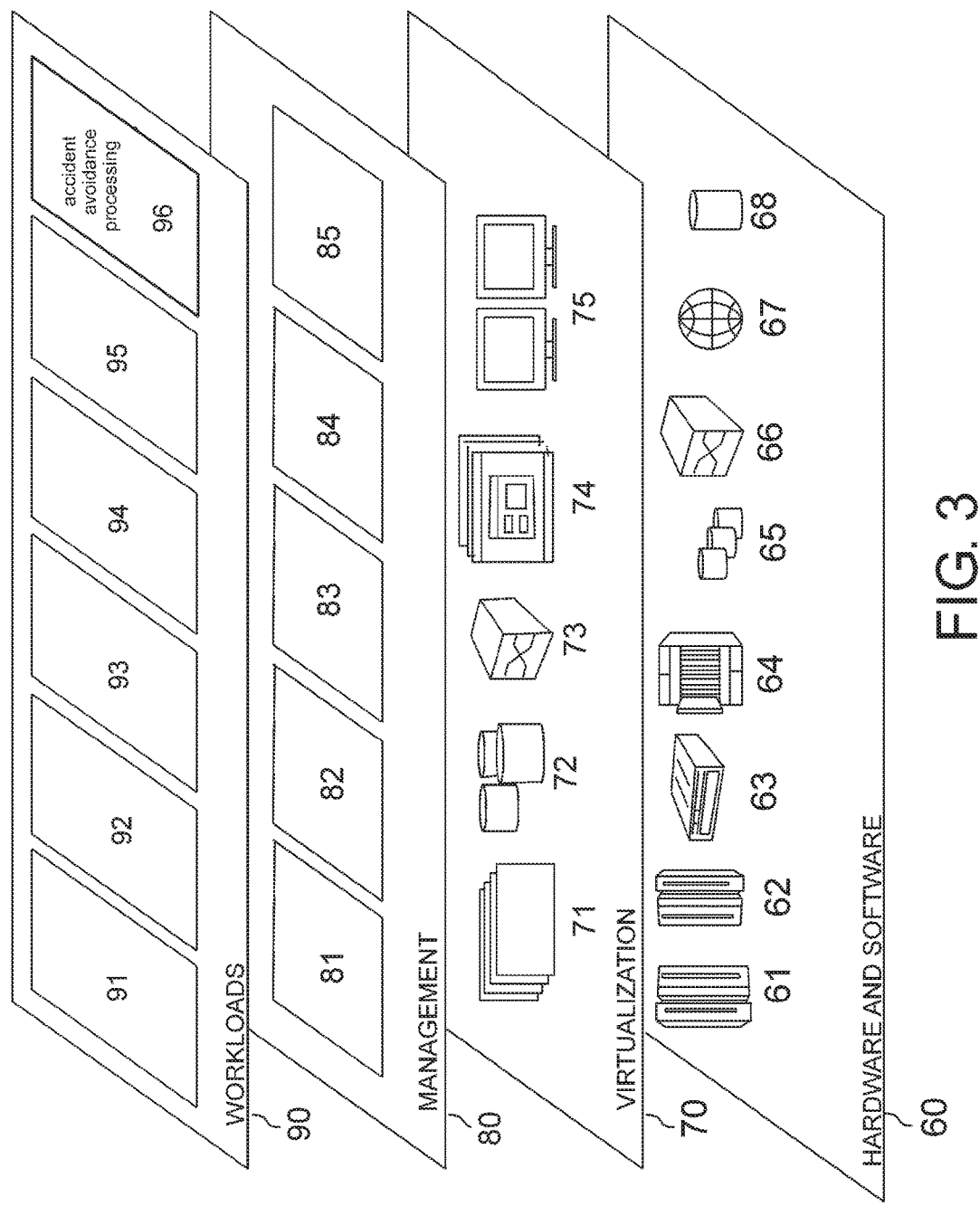
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and accident avoidance processing 96.

Referring back to FIG. 1, the program/utility 40 may include one or more program modules 42 that generally carry out the functions and/or methodologies of embodiments of the invention as described herein (e.g., such as the functionality provided by accident avoidance processing 96). Specifically, the program modules 42 may receive data provided from sensors of a mobile device, determine to what extent a user is interacting with the mobile device, determine various attributes and conditions of one or more users, determine events near and potential dangers to the user based on the analysis, and provide notifications of warnings, alerts, or information. Other functionalities of the program modules 42 are described further herein such that the program modules 42 are not limited to the functions described above. Moreover, it is noted that some of the modules 42 can be implemented within the infrastructure shown in FIGS. 1-3.

Figure 4:
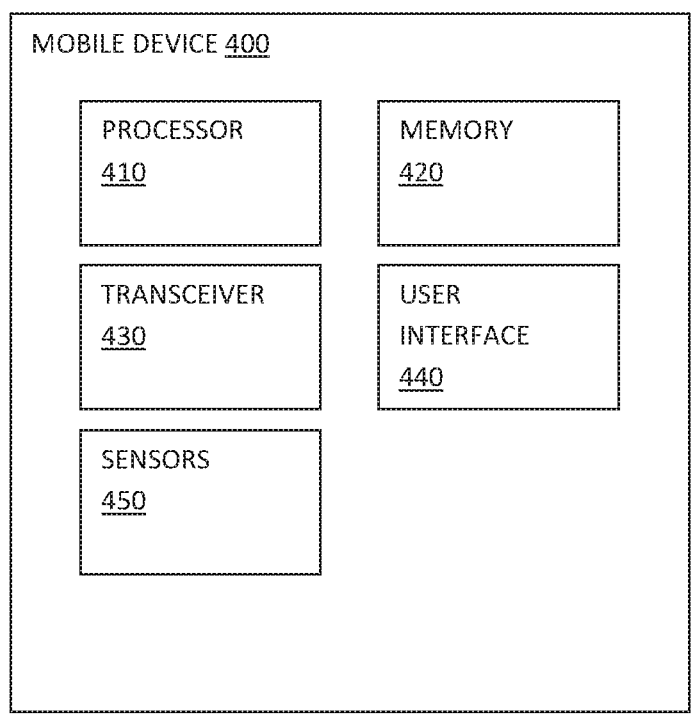
FIG. 4 shows a mobile device in accordance with aspects of the present invention.

FIG. 4 shows a mobile device in accordance with aspects of the present invention. In embodiments, the mobile device 400 includes a processor 410, a memory 420, a transceiver 430, a user interface 440, and at least one sensor 450. The mobile device 400 may comprise, for example, a smartphone, tablet computer, laptop computer, smart watch, music player, wearable electronic device, etc.

In embodiments, the processor 410 analyzes data stored in the memory 420, received via the transceiver 430 and/or the user interface 440, and detected or received via the at least one sensor 450. The processor 410 may control each of the memory 420, the transceiver 430, the user interface 440, and the at least one sensor 450 to perform operations. For example. the processor 410 may correspond to the processing unit 16 of the computer system/server 12 as shown in FIG. 1 and may implement operations of the accident avoidance processing 96 of FIG. 3.

In accordance with aspects of the invention, the processor 410 may determine a cohort of users. A cohort may be determined by the processor 410 to be a group of similarly situated users. A cohort may include one or more cohort users and/or cohort devices that generate, collectively, cohort data. A cohort may be limited to the mobile device 400. Cohorts of users can be identified by the processor 410 using a support vector machine (SVM). For example, students often congregate in groups returning from field trips and/or walking through the city. The processor 410 may employ noise tolerant time varying graphs to predict social group behavior, determine a cohort, and schedule notifications according to the cohort. The processor 410 can determine a user's cohort in terms of by whom the user is surrounded (e.g., a group of students walking together and playing a game on their mobile device, a group of people visiting a foreign city and sharing a map view to navigate, two people who are pushing baby strollers, etc.). Determining the user's cohort can be done by determining nearby users and devices, through visual data detected by light and/or image sensors and/or monitoring which applications are running on nearby devices and/or in what mode the applications are running.

In embodiments, the memory 420 stores data collected by the at least one sensor 450. The memory 420 of the mobile device 400 may be similar to the system memory 28 described herein with respect to FIG. 1 and can include computer system readable media in the form of volatile memory, such as random access memory (RAM) and/or cache memory. The memory 420 may store real-time and/or historical data and may allow the processor 410 to access such stored data. The memory 420 may store cohort data generated by cohort users and/or cohort devices.

In embodiments, the transceiver 430 may be configured to communicate with other devices directly, for example, via Bluetooth or other direct connection, or via an intermediate network which may include one or more wired and/or wireless networks. For example, the intermediate network may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the intermediate network may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks. The transceiver 430 may correspond to at least a portion of or at least one of the Input/Output (I/O) interfaces 22 of the computer system/server 12 as shown in FIG. 1.

The user interface 440 may accept information from and/or provide information to a user of the mobile device 400. The user interface 440 may include one or more display, touch screen, keyboard, microphone, speaker, light emitting diode, vibration generator, stylus, and the like. For example, the user interface 440 may correspond to the display 24 of the computer system/server 12 as shown in FIG. 1.

The at least one sensor 450 may include one or more sensors that communicate and provide data to the memory 420 to be stored therein according to instructions from the processor 410. The at least one sensor 450 may include at least one of: accelerometers, gyroscopes, compasses, pedometers, pressure and/or temperature sensors, audio sensors (e.g., a microphone), light sensors, barometers, card readers, image and/or heat sensors, location sensors, active or passive radio frequency identification (RFID), black ice detectors, pothole detectors, and the like. For example, the mobile device 400 may optionally incorporate a pothole detection apparatus, which determines the safe walking speed, and warns a user before they strike the pothole. Such pothole detecting apparatus may also detect a dangerous hole in the ground, for example, a hole dug by a construction crew or an open manhole.

In embodiments, the at least one sensor 450 may comprise an image sensor used in a black ice detection system. The image sensor may be disposed in the mobile device 400 having a forward field of view in a direction generally of forward travel of the user. The black ice detection system, also referred to as a black-ice detector, may include a control operably implemented by the processor 410 of the mobile device 400 to process images captured by the image sensor and operable to detect and discern black ice on a surface in front of the user in response to the image processing.

Figure 5:
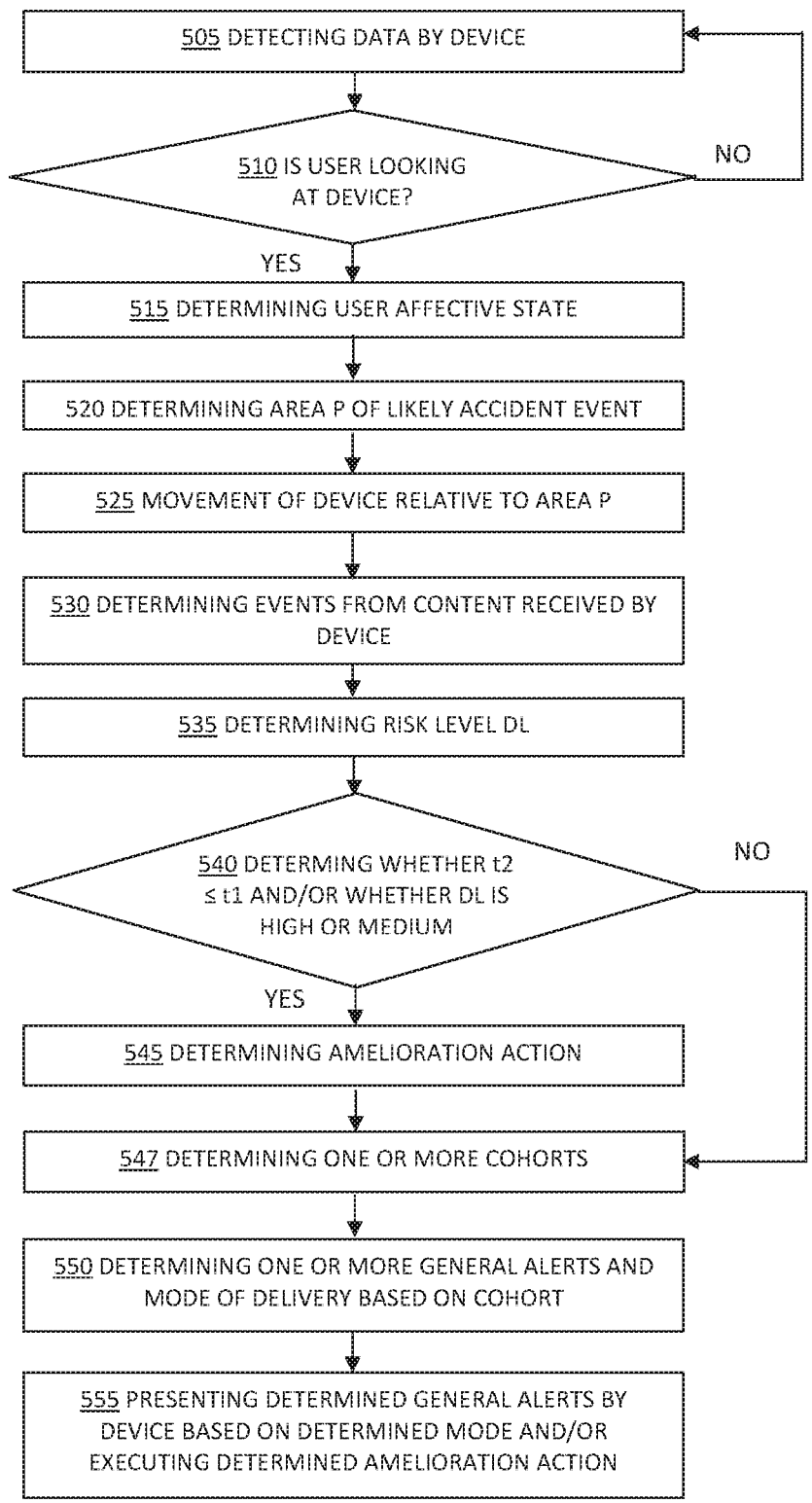
FIG. 5 shows an example flowchart for providing a safety alert to a user in accordance with aspects of the present invention.

FIG. 5 shows an example flowchart for providing a safety alert to a user in accordance with aspects of the present invention. The steps of FIG. 5 may be implemented in the mobile device of FIG. 4, for example, and are described using reference numbers of elements depicted in FIG. 4. The steps of FIG. 5 may also be implemented in any of the computing nodes 10, for example, as described above with reference to FIGS. 1 and 2. As noted above, the flowchart illustrates the architecture, functionality, and operation of possible implementations of systems, methods, and computer program products according to various embodiments of the present invention.

In embodiments, at step 505, data is detected by the mobile device 400, for example, the mobile device 400 illustrated in FIG. 4 or one or more of the computing nodes 10 of FIGS. 1 and 2. At step 505, the mobile device 400 may detect any data available to the sensors 450 of the mobile device 400. Similarly, the mobile device 400 may detect data from other users' devices, for example, cohort data detected by cohort devices. The mobile device may detect images from one or more cameras, for example, front and/or rear facing cameras of the mobile device 400. The detecting may include receiving data from one or more other devices in the area via a transceiver 430 of the mobile device 400, for example, from a communication network, direct receiving of data from an active or passive device, etc. The detecting may further include detecting or receiving data from any available sensor 450 connected via wireless network or physical connection to the mobile device 400, for example, accelerometers, gyroscopes, compasses, pedometers, pressure and/or temperature sensors, audio sensors (e.g., a microphone), light sensors, barometers, card readers, images and/or heat sensors, location sensors, active or passive radio frequency identification (RFID), black ice detectors, pothole detectors, and the like.

The detecting at step 505 may include techniques for mobile devices to subscribe to and share raw sensor data. For example, the raw sensor data associated with sensors of a mobile device 400 can be used to determine the movement or activity of the mobile device 400, and thereby a user. By sharing the raw or compressed sensor data with other computing or mobile devices and/or with other users, e.g., with a cohort, the other users and/or computing or mobile devices can determine a motion state of the mobile device 400 based on the sensor data. Additionally, in some instances, the other users and/or computing or mobile devices can determine a functional state of the mobile device 400 based on the sensor data from sensors 450 and the determined motion state of the mobile device 400. For example, functional state classification can be associated with each motion state (e.g., driving, walking) by further describing each motion state (e.g., walking on rough terrain, driving while texting). Such other computing or mobile devices may be cohort devices. Users may opt in, opt out, or be set by default to participate in the sharing of raw or compressed sensor data as described herein. Security and privacy of shared data may be maintained by anonymizing sensitive information before sharing or before analyzing. A mobile device 400 may maintain security and privacy of data by fetching a relevant service for a particular location or event from a backend service through an application program interface (API) via, for example, disclosure of only location information in a manner such that the API fetches necessary information securely and/or instantly.

The detecting at step 505 may also include receiving or keeping track of information, safety tips, and regulations based on location of the mobile device 400. For example, the mobile device 400 may access one or more websites to obtain current and/or predicted weather data for dangerous conditions, such as a heat wave, snow storm, flooding, etc. In another example, the mobile device 400 may access one or more websites to obtain data that defines safety tips and regulations, which may be helpful when a user is in a new location. The mobile device 400 may also detect input from safety workers who are involved in road construction and hazard management. Such information may be accessed from a wisdom of a crowdsourced safety hub. For example, the mobile device 400 may detect or receive inputs from transmitters disposed on or attached to cones, street or construction signs, or transmitters held by or carried by a worker, or may detect with a camera of the mobile device 400 a sign or construction equipment, materials, zone, indicators having a particular shape and/or pattern, and indicate to the user looking at the mobile device 400 the information provided by the sign. The detecting at step 505 may include the mobile device 400 detecting and/or interacting with electronic scheduling systems (e.g. bus schedule, tram schedule, train schedule, etc) and ITS s (intelligent transportation systems) to fetch roads and traffic context and condition. For example, road crews may mark in a database or a map the exact location of the pothole or black ice to be detected by the user's mobile device 400 via the transceiver 430 for warning the user via the user interface 440.

The detecting at step 505 may include the mobile device 400 detecting information from the rear facing camera to detect collision risks in a direction generally of forward travel of a user while walking and looking at the mobile device 400. For example, the detecting may include the mobile device 400 detecting information from the front facing camera to detect risks from behind the user. The detecting may include the mobile device 400 using techniques that estimate distances to nearby objects using acoustic signals, and the process can be enhanced by using images acquired from the mobile device's front and/or rear camera.

The detecting at step 505 may include detecting a pothole by the mobile device 400. Further, the detecting at step 505 may detect or access a database or a map marked by a road crew with the exact location of the pothole which may be accessed from a roads' crowdsourced database. In embodiments, the mobile device 400 may communicate with the database or map to update or provide a location of the detected pothole.

The detecting at step 505 may include the mobile device 400 using sensors 450 to detect road hazards. For example, the mobile device 400 may have a black-ice detector. The detecting may include imaging by an imaging sensor of the sensors 450 of the mobile device 400 having a forward field of view in a direction generally of forward travel of the user and processing images captured by the imaging sensor to detect and discern black ice on a surface in front of the user.

At step 510, the processor 410 of the mobile device 400 determines whether the user is looking at the mobile device 400. The determining may include using machine learning and visual analytics algorithms based on the data detected at step 505. For example, the mobile device 400 may analyze image data received from at least one of the sensors 450 of the mobile device 400, for example, a front facing or rear facing camera or light sensor, to determine facial features, e.g., eyes, nose, and/or mouth, in the received data and their orientations with respect to a display of the user interface 440. The mobile device 400 may have stored in the memory 420 a user profile that includes at least one picture of the user's face, and the mobile device 400 may compare the pictures from the user profile to the image data received by the mobile device to determine the orientation of the user's face with respect to the display of the user interface 440. The pictures associated with the user may be specifically designated and/or captured by the user and/or may be determined by the mobile device, for example, by analysis of the pictures to determine whether the picture is taken by the user of the user.

At step 515, the mobile device 400 determines a user affective state and the nature of the user interaction with the mobile device, for example, by the processor 410 interacting with the memory 420, the user interface 440, and the sensors 450. In embodiments, the mobile device 400 determines that the user is interacting/engaging with the mobile device 400 and to the extent to which the user is engaged with the mobile device using machine learning and visual analytics algorithms based on the data detected at step 505. For example, the mobile device 400 may determine a duration t1 of user interaction with the mobile device 400. And, the mobile device 400 may determine a level L of a user affective state based on the type and context of the user interaction with the mobile device 400 and the duration t1 of the user interaction. Step 515 is described further with respect to FIG. 6.

At step 520, the mobile device 400 determines an area P that is a location of a likely accident event. The area P may be determined or predicted based on data detected at step 505. As but one possible example, the area P may be determined to be an edge of a train platform determined by analysis of image data from at least one sensor 450 of the mobile device 400, for example, a rear facing camera, or may be determined by the nature of the movement of mobile devices, e.g., a cohort, and/or other data as described herein. As another example, the area P may be determined to be a pothole or an area of black ice determined by analysis of image data from at least one sensor 450 of the mobile device 400, for example, a rear facing camera.

In embodiments, the determining of the area P, the mobile device determines that a likely accident event has occurred by detecting an accident or detecting a near accident to determine an accident risk while the user is looking at the mobile device 400. Based on historical and/or real-time analysis of the data of the various sensors of and inputs to the mobile device 400, the mobile device 400 may determine that a likely accident event, e.g., an accident or collision, occurred or nearly occurred at an area, determine accident risks of an area, and predict that an area may have a higher risk for accidents or collisions. Similarly, historical and/or real-time analysis of data of the various sensor of and inputs to other mobile devices at a same or about a same location as the mobile device 400 may be analyzed to determine that an accident event occurred, e.g., cohort data may be analyzed to determine occurrence of an accident at a same location.

For example, at step 520, the mobile device 400 may detect that a user (or cohort user) stepped off of a curb and stumbled, and determine and store that action as an accident. The mobile device 400 may also store data detected by the sensors 450 of the mobile device 400 as associated with the accident. As another example, the mobile device 400 may record and store that the user was looking at the mobile device 400, had been using an application for less than 5 seconds, that the user was crossing a road not at an intersection late at night, and conclude that the user was tired and distracted by the opening of the application on the mobile device 400 and stumbled off of the curb. Such information may be recorded along with the accident. Information or data about the accident may be recorded or stored in memory 420 of the mobile device 400 and may include a location of the accident, e.g. GPS coordinates; Wifi hotspots; interior mapping of buildings, for example a mall; street corner identification; identification of stairs; identification of a region on a train platform; current weather; current road conditions; current sidewalk conditions; noise/distraction levels; step or ramp steepness; history of accidents; etc. Similarly, data from other for users and/or devices may be stored and analyzed to determine accidents associated with those users and/or devices as part of a cohort.

At step 520, the mobile device 400 may detect as a near accident, for example, that the user (or cohort user) stepped into traffic while looking at the mobile device 400, for example, by determining traffic density from data from a rear facing camera, that the user was looking at the mobile device 400 from data from a front facing camera, the location from a GPS receiver, and that the user was watching a video on the mobile device 400. Similarly, cohort data from cohort devices may be stored and analyzed to determine near accidents associated with those users and/or devices as part of a cohort.

At step 520, the mobile device 400 may determine an accident risk based on the determinations that an accident occurred or nearly occurred from data of the various sensors 450 of the mobile device 400. Similarly, cohort data may be analyzed and contribute to the determination of the accident risk. For example the mobile device 400 may determine that the user fell (i.e., accident) or nearly fell (i.e., near accident) down a set of stairs while the user was looking at the mobile device 400. Data from the rear facing camera may be analyzed to determine a proximity of the user to the set of stairs or the location of the user's fall. The accident risk (or risk of accident) may be a determination that an accident likely occurred with confidence level C by eye tracking on the by the mobile device 400, analysis of a user's gait, analysis of a user's average stride length, accelerometer detection of unusual motions/falling, facial expression analysis, sound analysis (e.g., scream, car honk, etc), user input/feedback including text and speech analysis (e.g., "I almost tripped" or "I almost got hit by a car"), and the like. Users may opt in, opt out, or be set by default to have input information analyzed for risk analysis and/or shared for risk analysis and warning of cohorts described herein. The mobile device 400 may employ statistical machine learning techniques to model and capture changes in acceleration, rotational velocity and user orientation along the x, y and z axes using sensors 450 of the mobile device 400. The accident, near accident, and accident risk may also be estimated or determined using data from any of: the mobile device or nearby devices, such as another user's mobile device, cameras near an intersection or on a train platform, and the like.

At step 520, the data associated with the determined accident and near accident may be evaluated historically or in real-time to determine an area P having a higher likelihood of accident, i.e., a higher accident risk. Further, a crowdsourcing database that maintains cohort data including accident hotspots, other real-time sensory data (e.g., acoustic sensors, noise sensors), information or data from neighborhood devices (e.g., nearby mobile phones, surveillance cameras, vehicles, trains, etc.) may be maintained and accessed to determine an area has a higher accident risk resulting in that area being designated as an area P having a higher accident risk. Plural areas P each having an accident risk higher to at least some extent relative to other areas may be recorded and stored in a memory 420 of the mobile device 400. The higher accident risk determined for the area P may be merely that an accident is known to have occurred at that location or may be determined according a higher average or number of accidents and near accidents being determined for that location with respect to the user or other users, e.g., cohort users.

At step 525, the mobile device 400 may determine movement of the mobile device 400 relative to the determined area P. For example, the mobile device 400 may determine a time t2 for intersection of the mobile device 400 with the area P. Step 525 is described in more detail in FIG. 7.

At step 530, the mobile device 400 determines events likely to affect the user of the mobile device 400 by analysis of content received by the mobile device 400 for example, by the processor 410 interacting with the memory 420, the transceiver 430, the user interface 440, and the sensors 450. For example, the mobile device 400 may determine events likely to affect the user of the mobile device 400 based on time and proximity to the mobile device 400 from the content received by the mobile device 400 by applying content analysis techniques, such as, by detecting emergency situations from incoming text message, incoming tweets, incoming calls, incoming social media alerts, checking maps, and the like. For example, receiving text message or voice message asking "are you okay?" from family or friends may indicate an emergency situation at a location at which the user is expected to be. Expected location may be determined, for example, by content analysis of emails, texts, schedules, calendars, and the like. Location may also be determined based on location data sources, for example, GPS, Cell towers, Wifi, satellite, etc. Similarly, nearby devices sending messages or receiving similar messages may indicate that an emergency is happening at that location. Other events may be determined according to the content analyzed. Such tracking and analyzing, e.g. contextual analysis, may be of the mobile device 400 or of a group, or cohort, of users and allow the mobile device 400 to make intelligent decisions while generating amelioration actions and alerts.

At step 535, the mobile device 400 determines a risk level DL. The mobile device 400 may determine the risk level DL as high, medium, low, or none as an indication of a threat to a user based on all values of all the data detected by the mobile device 400 and using learning systems, such as video analytics, deep neural net, etc. For example, the risk level DL may be determined to be high when a user is determined to be looking at the mobile device 400, a user affective state is determined to be high at step 515, the area P is determined to be near at step 520, the mobile device 400 is determined to be moving quickly and/or toward the area P at step 525, and/or an emergency situation is determined at step 530. The risk level DL may be determined to be medium or low when a user is determined to be looking at the mobile device 400, a user affective state is determined to be medium at step 515, the area P is determined to be at a safe distance at step 520, the mobile device 400 is determined to be moving at a moderate pace and/or toward the area P at step 525, and/or no emergency situation is determined at step 530. The risk level DL may be determined to be none when a user is determined to be looking at the mobile device 400 and a user affective state is determined to be low at step 515, no area P is determined to be near at step 520, the mobile device 400 is determined to be not moving or moving slowly at step 525, and/or no emergency situation is determined at step 530. The various risk levels DL need not be mutually exclusive and may be determined according to default settings or the sensitivity may be set by a user. For example, specific circumstances may be determined to be a high risk level DL by default, e.g., a natural disaster is detected or occurring.

At step 540, the mobile device 400 determines whether $t2 \leq t1$ (from steps 515 and 525) and/or whether the risk level DL is high or medium (from step 535). The mobile device 400 determines whether t2, the time determined for intersection of the mobile device 400 with the determined area P at step 715, is less than or equal to t1, the duration of the user interaction with the mobile device 400 as determined and predicted at step 610. In other words, the mobile device 400 determines whether the user is predicted to intersect the determined area P before the user is predicted to stop interacting with mobile device 400 such that the mobile device 400 predicts that the user will encounter the dangerous area P while being distracted by the mobile device 400 when time $t2 \leq$ duration t1. Also, the mobile device 400 determines whether the risk level DL is high or medium. If one or both of the conditions, i.e., $t2 \leq t1$ and/or risk level DL is high or medium, then the process moves to step 545 to determine an amelioration action.

At step 545, the mobile device 400 determines an amelioration action to be taken in view of one or more of the conditions of step 540 being met, namely that $t2 \leq t1$ and/or risk level DL is high or medium. The mobile device 400 selects an amelioration action, for example, vibrate the mobile device 400, power off the mobile device 400, blur the display of the user interface of the mobile device 400, output a loud voice, instruction, or alarm, blink at least a portion of the display or other light, for example, the camera flash, of the mobile device 400, change colors of the display or other light of the mobile device 400, lock the mobile device 400, etc, so as to get the user's attention and/or to warn the user of a coming danger. The amelioration action may be a real-time alert or an alert, as described herein, and may be an alert that is more invasive to the user than a general alert, for example, by length of time or extent to which an action is taken. For example, a general alert may be determined to vibrate the mobile device for 1-3 seconds whereas the amelioration action may be determined to vibrate the mobile device for 5-20 seconds and/or until the risk level DL is determined to be low or none. Similarly, audio/light output and display changing amelioration actions may be maintained for 5-20 seconds and/or until the risk level DL is determined to be low or none whereas audio output and display changing general alerts may be maintained for 1-3 seconds, for example. The extent to which an amelioration action is taken may be greater than a general alert. For example, the vibrating the mobile device 400 amelioration action may vibrate more strongly than a general alert that vibrates the mobile device 400.

In step 545, the amelioration action may be determined to be a persistent indication of a risk as a user moves about and/or looks at the mobile device 400. This presentation of the amelioration action may persist until the risk level DL is determined to be low or none.

If neither of the conditions at step 540 is met, i.e., t2 is not less than or equal to t1 and risk level DL is low or none, then the process moves to step 547 to determine one or more cohorts. A cohort may be determined by the processor 410 of the mobile device 400 to be a group of similarly situated users or devices. A cohort may include one or more cohort users and/or cohort devices that generate, collectively, cohort data. The cohort may be determined in step 547 to be only the mobile device 400, for example, by analyzing historical data from the mobile device 400 only. Cohorts of users can be identified by the processor 410 using a support vector machine (SVM). For example, students often congregate in groups returning from field trips and/or walking through the city. The processor 410 may employ noise tolerant time varying graphs to predict social group behavior and determine a cohort. The processor 410 can determine a user's cohort in terms of by whom the user is surrounded (e.g., a group of students walking together and playing a game on their mobile device, a group of people visiting a foreign city and sharing a map view to navigate, two people who are pushing baby strollers, etc.). Inferring the user's social cohort can be done by determining nearby users, either through visual data detected by light and/or image sensors and/or monitoring which applications are running on nearby devices and in what mode the applications are running.

In step 547, a cohort of users may be determined to be a group of users identified by common characteristics, for example, age, activity, time of activity, device, features of a device (e.g. size of screen, processing capability), type or nature of device. A cohort may be determined as a group of users of a same age, a group of users having similar characteristics or activity, e.g., wearing glasses or sunglasses, walking a dog, pushing a stroller, riding a bike, scooter, or motorcycle, riding in a car, bus, subway, plane, tractor-trailer, delivery truck, etc., or may be determined based on how a mobile device is used, e.g., looking at the mobile device, texting, typing, using an application, playing a game, talking to the mobile device, placing a telephone call, watching a video, a length of time of total use or use of a particular function or application, etc. For example, the use of mobile devices while riding with a group of cyclists may be determined as a cohort. Not only is the user distracted by the phone, but the bike may act erratically, depending on road conditions, the kind of bike, e.g., thin tires or thick tires, etc. Similarly, the use of mobile devices while walking a dog or pushing a stroller may be determined as a cohort. Not only is the person distracted by the phone, the dog may pull and act erratically or the baby may scream or wriggle about.

In step 547, determining the user's cohort can be done by determining nearby users and devices, through visual data detected by light and/or image sensors and/or monitoring which applications are running on nearby devices and/or in what mode the applications are running.

In step 550, the mobile device determines one or more general alerts and the mode of delivery of the alert based on the one or more cohorts determined at step 547. As described herein, a general alert may be a real-time alert and be an alert having a length of time or extent to which an action is taken less than an amelioration action. The mobile device 400 may determine a general alert to be a sound, vibration, graphics, an audio output, etc. For example, the general alert may be to vibrate the mobile device 400, generate a loud audio alert, etc. For example, the mobile device 400 may audibly provide a general alert by instructing the user to "look up!" The user interface 440 of the mobile device 400 may be equipped with visual indicator separate from the display of the user interface 440 to communicate the general alert by changing color, changing intensity, blinking, etc.

In embodiments, step 550 also includes the mobile device 400 determining the mode of delivery of the general alert. For example, the general alert may be provided by the mobile device 400 and/or provided by nearby devices, e.g., cohort devices, street signs, fire hydrants, traffic lights, mailboxes, etc. The nearby devices may include active or passive sensors and/or readers to know the location of the user mobile device 400. The nearby devices may be configured to transmit or receive and transmit the general alert to warn a user of the danger to the user, for example, that the user is approaching a street sign and not showing indication of slowing or moving to avoid hitting the street sign.

At least one of the general alerts and the mode of delivery of the alert determined in step 550 may be based on a determined cohort of the user and/or mobile device 400. As a result, the notification/warning may be presented on the mobile device 400 and/or other devices and/or mobile devices. For example, image and location data detected at step 505 may be analyzed by processor 410 of the mobile device 400 to determine an intersection of roads, while the user is determined to be looking at the mobile device 400 at step 510. The user may be determined to be using a particular application at step 515, and the user may be determined to be moving toward the intersection determined to be an area P of a likely accident event in operation 525. At step 550, the mobile device 400 may determine a general alert to be delivered, and the mode of delivery of the determined general alert may be determined to deliver the general alert to a car approaching the same intersection, for example, an autonomous car, to alert the car and/or driver of the presence of the user of the mobile device 400. Here, the car and/or driver of the car may be determined to be in a cohort of the user of the mobile device 400 based on location, proximity, and/or likely interaction based on movement of one or more of the car and the owner of the mobile device 400.

At step 550, other alert mechanisms may be determined, for example, a transparent texting, web browsing, or eReader system that uses various crowd-source and history-based triggers, and could use a rear facing camera to replace the messaging screen's background with a live feed of whatever the camera is pointing at. Rather than obscuring a view of the surroundings, the messaging application would become a window on the world, with colored chat bubbles or text sitting over the top.

In step 550, if music is being played through the speakers or headphones, the determined general alert may be real world audio substituted, for example, to play an emergency message being broadcast, or a warning transmitted through the speaker and/or headphones.

In step 550, the general alert may be based on safety tips and regulations. For example, the mobile device 400 may keep track of safety tips and regulations and provide geo-location based alerts to the mobile device 400 user during walking. For example, the mobile device 400 may determine the general alert to be safety tips presented to a user, for example, (i) Never cross or walk in the street while using a mobile device 400; (ii) Do not walk with headphones in your ears; (iii) Keep track of your surroundings. Further, the general alert may be determined to include information or a warning about, for example, a pothole or black ice detected at step 505. In such cases, the mobile device 400 could determine the general alert to be to notify road crews of the exact location of the pothole or black ice based on analysis of the data detected by the sensors 450 of the mobile device 400, i.e., the general alert may be determined to be for a device other than the mobile device 400.

In step 550, the general alert may be determined to be a persistent indication of a risk as a user moves about and/or looks at the mobile device 400. This presentation of the general alert may persist until the user of the mobile device 400 slows down, looks at the real world or away from the mobile device 400, etc.

At step 555, the mobile device 400 may present the determined alerts based on the determined mode and/or execute the determined amelioration action. For example, if the mobile device 400 determines that in 5 meters there will be a known dangerous intersection and the user is now using social media, the mobile device 400 may display a message to request that the user please move to the side of the walkway. As another example, based on the tracking and analyzing described herein, e.g., if the mobile device 400 detected that the user is very emotional and confused, and expected incident risk level DL is high, a visual indicator on the mobile device 400 may change status, and the mobile device 400 may also decide to lock the usage of certain mobile apps. This may discourage the use of phone while walking, e.g. in some areas for some cohorts.

Figure 6:
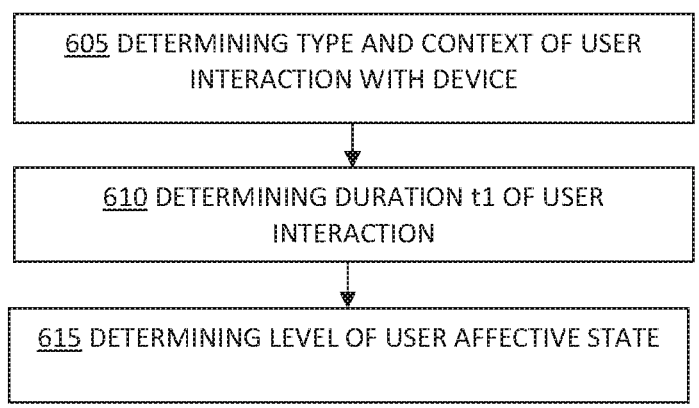
FIG. 6 shows an example flowchart for determining a nature of a user interaction with a mobile device in accordance with aspects of the present invention.

FIG. 6 shows an example flowchart for determining a user affective state with a mobile device 400 in accordance with aspects of the present invention. FIG. 6 further describes operations of step 515 of FIG. 5. At step 605, the mobile device determines a type and context of user interaction with the mobile device 400, for example, by the processor 410 interacting with the memory 420, the user interface 440, and the sensors 450, for example, by machine learning and visual analytics algorithms based on the data detected at step 505 of FIG. 5. The mobile device 400 may determine whether and to what extent a user is typing, reading, replying/texting to a post, watching a video, reading an article while walking, pushing baby stroller, walking up/down stairs, biking, sitting nearby a train platform, wearing glasses or sunglasses, walking a dog, listening to audio output from the mobile device by speaker or earbuds or headphones, playing a game, talking to the mobile device, placing a telephone/video call, the recipients or participants of a communication, etc. The mobile device 400 may, for example, determine that a user is pushing a baby stroller by leveraging data, e.g., image data, and predetermined rules or an algorithm.

The context of the user interaction may indicate an emotional state of the user based on machine learning and visual analytics. For example, the speed at which a user is typing may indicate, for example, an agitated or depressed emotional state. Visual analytics may be applied to data from a front facing camera to determine that a user is agitated or depressed based on facial expressions of the user compared to, for example, known facial expressions. Similarly, audio data received by a microphone may determine emotional state from speech qualities and patterns. For example, screaming may indicate fear or anger while a softer tone may indicate a relaxed or depressed emotional state.

At step 610, the mobile device determines a duration t1 of the user interaction for example, by the processor 410 interacting with the memory 420, the user interface 440, and the sensors 450. For example, the mobile device 400 may determine the duration t1 of the user interaction by machine learning and visual analytics algorithms based on the data detected at step 505 of FIG. 5. The mobile device 400 may determine a length of time of total use of the mobile device 400 by the user or by plural users. For example, based on the data detected at step 505 of FIG. 5, the mobile device 400 may determine whether the user or a new user is interacting with the mobile device 400, and the mobile device 400 may determine that the mobile device 400 has been or is being passed among different users and track the time of use according to each user. The passing of the mobile device 400 between plural users may be determined according to data detected by the sensors 450, for example, accelerometers and image sensors. Further, the mobile device 400 may determine a length of time of use of a particular user of a particular function or application.

The mobile device 400 may also predict a length of time that a user will be interacting with the mobile device 400 or the particular function or application at step 610. The duration t1 may include an amount of time predicted by the mobile device 400. The mobile device 400 may predict the amount of time to be included in duration t1 based on machine learning and visual analytics of previous data detected by the sensors 450 of the mobile device 400 and stored in the memory 420 of the mobile device 400. For example, if the mobile device 400 determines that a user is likely going from home to office based on location and time of day, the commute usually lasts about thirty minutes, and the user usually browses social media during the commute, the mobile device 400 may predict that the user will be continuing to use social media for another 10 minutes. However, if the mobile device 400 detects that there is heavy traffic, the mobile device 400 may determine that the commute will likely take longer and predict that the user will be continuing to use social media for another 10 minutes plus an additional 10 minutes due to traffic congestion. The duration t1 may be based on analysis of historical data alone or on historical data and real-time data detected by the sensors 450 of the mobile device 400. Similarly, the duration t1 may be based on data detected by sensors of other mobile devices, i.e., cohort data.

At step 615, the mobile device 400 determines a level L of a user affective state based on the type and context of the user interaction with the mobile device 400 as determined at step 605 and the duration of the user interaction as determined at step 610. The mobile device 400 may determine the level L of a user affective state to be high, medium, or low. A high level L of a user affective state may be determined when a user is focused on the mobile device 400, for example, when using a particular application, e.g., a social media application, when watching a television program or typing or listening to a lecture or serious podcast, or using an application for a short period of time, e.g., starting the application, or for a long time, e.g., slowly scrolling indicating great attention for reading or inspection of a picture. A medium level L of a user affective state may be determined when a user is moderately engaged with the mobile device 400, for example, lightly reading instead of intensely reading as determined by scroll speed, or listening to a comedy podcast or popular music. A low level L of user affective state may be determined when the user is interacting with the mobile device 400 but not looking at the mobile device 400 or when the user is only carrying the mobile device 400. The levels L of the user affective state may be determined according to the various levels of engagement and interaction based on the data detected by the sensors 450 of the mobile device 400, and the forgoing are merely examples. The levels L of the user affective state may be set, changed, determined by a user or administrator, and the like.

Figure 7:
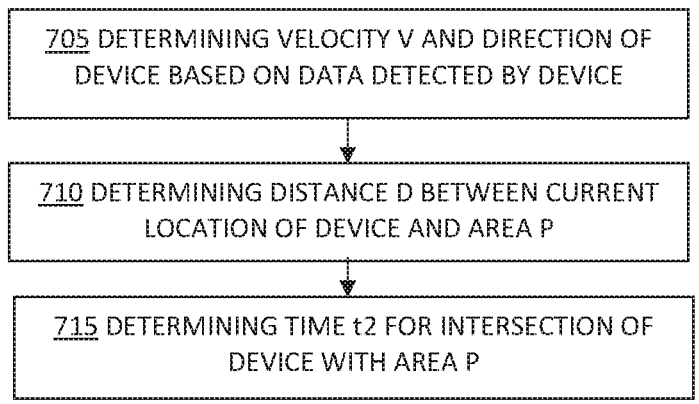
FIG. 7 shows an example flowchart for determining a nature of a user interaction with a mobile device in accordance with aspects of the present invention.

FIG. 7 shows an example flowchart for determining a nature of a user interaction with a mobile device 400 in accordance with aspects of the present invention. At step 705, the velocity v and the direction of the mobile device 400 is determined according to data detected by the sensors 450 of the mobile device 400. For example, the velocity v, direction of the user walking/movement may be based on location data sources, e.g., GPS, cellular towers, Wifi, satellite, etc.

At step 710, the mobile device 400 may determine a distance D between the current location of the mobile device 400 and the determined area P. For example, the distance D may be based on location data sources, e.g., GPS, Cell towers, Wifi, satellite, etc. At step 715, the mobile device 400 may determine a time t2 for intersection of the mobile device 400 with the area P or an approach of the mobile device 400 to the area P.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   determining, by a mobile device, that a user is looking at the mobile device based on sensor data;
   determining, by the mobile device, an area of a likely accident event;
   generating, by the mobile device, an alert based on the determining that the user is looking at the device and the determining the area of the likely accident event; and
   determining a cohort of the user,
   wherein the generating the alert further comprises generating the alert based on the determined cohort of the user; and
   the cohort of the user comprises other users having characteristics similar to the user.

2. The method of claim 1, wherein the similar characteristics comprise at least one of activity, time of activity, device, features of a device, type of device, and nature of device.

3. The method of claim 2, wherein the determining the area of the likely accident event comprises determining an accident risk of the area relative to other areas.

4. The method of claim 3, wherein the determining the accident risk of the area relative to other areas comprises detecting at least one of an accident and a near accident while the user is looking at the mobile device.

5. The method of claim 4, wherein the mobile device determines the accident risk according to at least one of: eye tracking, analysis of a user's gait, analysis of a user's average stride length, accelerometer detection of motions, accelerometer detection of falling, facial expression analysis, sound analysis, text analysis, and speech analysis.

6. The method of claim 1, wherein the alert comprises an amelioration action of at least one of: vibrating the mobile device, powering off the mobile device, blurring a display of the mobile device, outputting a sound, and changing colors of the display of the mobile device.

7. The method of claim 1, wherein the alert comprises a general alert of at least one of: vibrating the mobile device, changing displayed graphics, and outputting a sound.

8. The method of claim 1, wherein the determining the area of likely accident event comprises determining an area includes a pothole or black ice.

9. The method of claim 1, wherein the alert is a persistent indication of a risk displayed on a display of the mobile device.

10. The method of claim 1, further comprising determining, by the mobile device, a duration of a user interaction with the mobile device,
    wherein the determining the duration of the user interaction comprises predicting an amount of time that a user will use an application.

11. The method of claim 10, further comprising determining that the user will intersect the area before the predicted amount of time that the user will use the application expires,
    wherein the generating the alert is further based on the determining that the user will intersect the area before the predicted amount of time that the user will use the application expires.

12. The method of claim 1, wherein the generated alert is delivered to another device.

13. The method of claim 1, further comprising:
    determining a risk level based on the received data; and
    determining an amelioration action based on the determined risk level.

14. A computer program product for a safety system for users, the computer program product comprising a computer readable storage medium having program instructions embodied therewith, the program instructions executable by a mobile device to cause the mobile device to:
    receive data from at least one sensor of the mobile device;
    determine that a user is looking at the mobile device based on the received data;
    determine a cohort of the user, the cohort being a group having characteristics similar to the user; and
    execute on the mobile device an alert based on the user being determined to be looking at the mobile device and data of the cohort,
    wherein the determining the cohort comprises determining an activity performed by the user of the mobile device in common with users of other mobile devices.

15. The computer program product of claim 14, wherein the determining the activity comprises analyzing image data detected by the mobile device.

16. A system comprising:
    a CPU, a computer readable memory and a computer readable storage medium associated with a mobile device;
    program instructions to receive data from at least one sensor of the mobile device;
    program instructions to determine that a user is looking at the mobile device based on the received data;
    program instructions to determine a user affective state of the user;
    program instructions to execute an alert based on the determining the user is looking at the device and the user affective state of the user; and
    program instructions to determine a cohort of the user,
    wherein the program instructions are stored on the computer readable storage medium for execution by the CPU via the computer readable memory,
    the alert is based on the determined cohort of the user; and
    the cohort of the user comprises other users having characteristics similar to the user.

17. The system of claim 16, wherein the program instructions to determine the user affective state of the user comprises program instructions to determine that a user is using a particular application of the mobile device.

* * * * *